(12) United States Patent
Hyodo et al.

(10) Patent No.: US 12,124,137 B2
(45) Date of Patent: Oct. 22, 2024

(54) DISPLAY DEVICE

(71) Applicant: Japan Display Inc., Tokyo (JP)

(72) Inventors: Yosuke Hyodo, Tokyo (JP); Shinichiro Oka, Tokyo (JP); Toshiharu Matsushima, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/868,898

(22) Filed: Jul. 20, 2022

(65) Prior Publication Data

US 2022/0350183 A1 Nov. 3, 2022

Related U.S. Application Data

(63) Continuation of application No. PCT/JP2020/044190, filed on Nov. 27, 2020.

(30) Foreign Application Priority Data

Jan. 21, 2020 (JP) .................................. 2020-007665

(51) Int. Cl.
*G02F 1/1345* (2006.01)
*G02F 1/1339* (2006.01)

(52) U.S. Cl.
CPC .......... *G02F 1/1345* (2013.01); *G02F 1/1339* (2013.01)

(58) Field of Classification Search
CPC .......... G09F 9/00; G09F 9/35; G02F 1/13458; G02F 1/1345; G02F 1/1339;

(Continued)

(56) References Cited

U.S. PATENT DOCUMENTS 11,751,342 B2 * 9/2023 Huang ................ G02F 1/13452
361/807
2006/0232495 A1 * 10/2006 Chang ....................... G09G 3/20
345/1.1

(Continued)

FOREIGN PATENT DOCUMENTS

JP H10-260423 A 9/1998
JP 2001-042353 A 2/2001

(Continued)

OTHER PUBLICATIONS

International Search Report mailed on Jan. 19, 2021, for the corresponding PCT Application No. PCT/JP2020/044190, with English machine translation.

*Primary Examiner* — Nitin Patel
(74) *Attorney, Agent, or Firm* — Michael Best & Friedrich LLP

(57) ABSTRACT

According to one embodiment, a display device includes a first display panel, a second display panel and an adhesive layer. The first display panel includes a first substrate with a first terminal area in which a first terminal part is formed, and a second substrate which is opposed to the first substrate and has a thickness different from that of the first substrate. The second display panel includes a third substrate with a second terminal area in which a second terminal part is formed, and a fourth substrate which is opposed to the third substrate and has a thickness different from that of the third substrate. The first terminal area and the second terminal area do not overlap with each other in a plan view.

4 Claims, 16 Drawing Sheets

(58) Field of Classification Search
CPC ........... G02F 1/133342; G02F 2202/28; G02F 2201/44; G09G 2300/023; G09G 2320/0686; G06F 1/1647; G06F 1/1641; H10K 59/128; H10K 2102/3031
See application file for complete search history.

(56) References Cited

U.S. PATENT DOCUMENTS

| | | | |
|---|---|---|---|
| 2009/0273743 A1* | 11/2009 | Sawabe | G02F 1/13471 349/81 |
| 2010/0033655 A1* | 2/2010 | Nakamoto | H04N 5/66 349/81 |
| 2010/0097550 A1 | 4/2010 | Yamaguchi et al. | |
| 2010/0118006 A1* | 5/2010 | Kimura | G09G 3/3611 348/673 |
| 2016/0210103 A1* | 7/2016 | Yoshizumi | G06F 3/147 |
| 2017/0208320 A1* | 7/2017 | Suzuki | H04N 13/373 |
| 2018/0031897 A1 | 2/2018 | Kikuchi et al. | |
| 2018/0033362 A1* | 2/2018 | Yamazaki | G09G 3/3648 |
| 2018/0286340 A1* | 10/2018 | Tanaka | G02F 1/13439 |
| 2019/0004349 A1* | 1/2019 | Kobayashi | G02F 1/133514 |
| 2019/0041684 A1* | 2/2019 | Imaoku | G02F 1/1368 |
| 2022/0375377 A1* | 11/2022 | Ishihara | G02F 1/133601 |

FOREIGN PATENT DOCUMENTS

| | | | |
|---|---|---|---|
| JP | 2002-072243 A | 3/2002 | |
| JP | 2002-202526 A | 7/2002 | |
| JP | 2010-097118 A | 4/2010 | |

* cited by examiner

F. I. G. 2

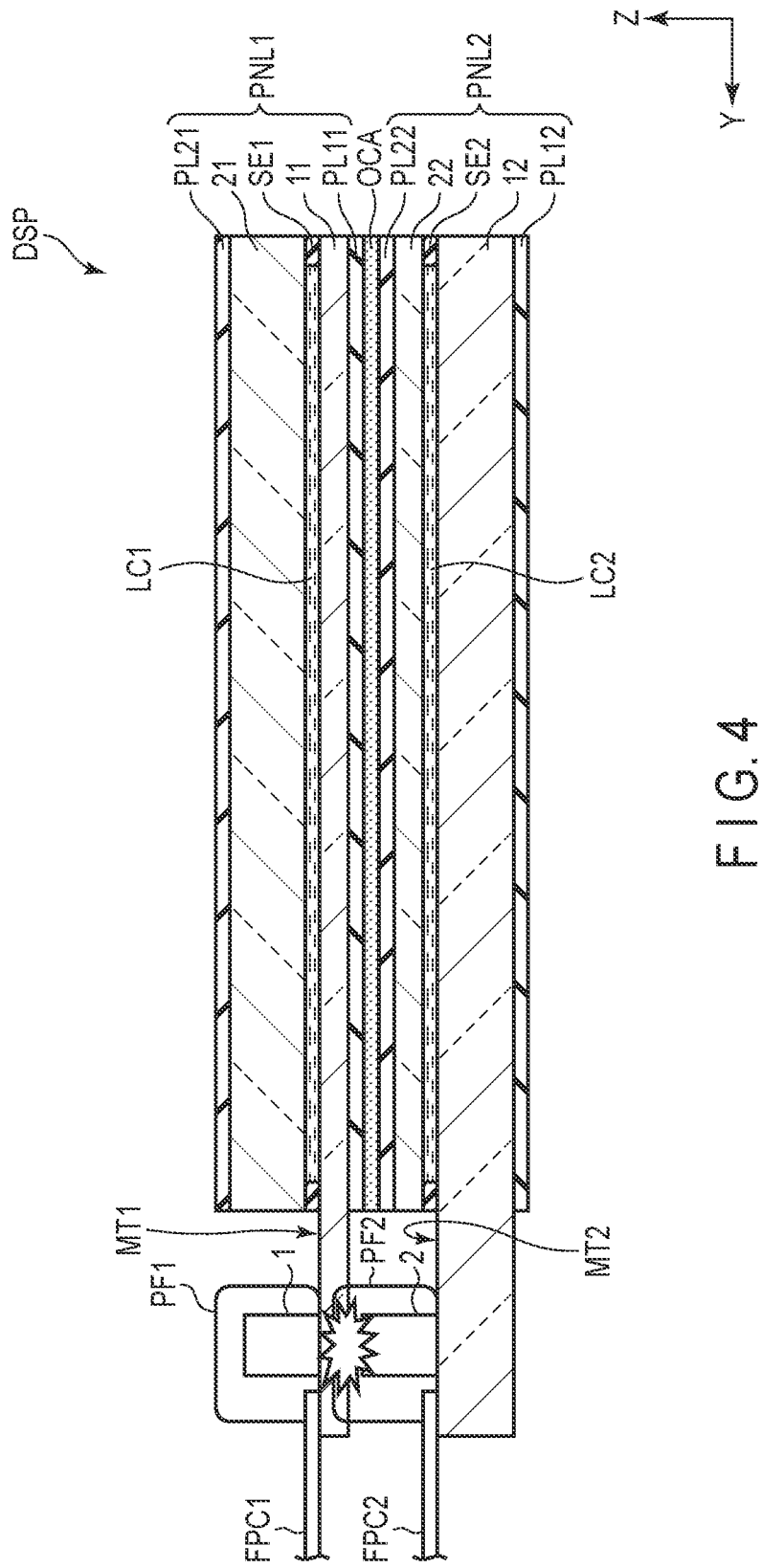
F I G. 4

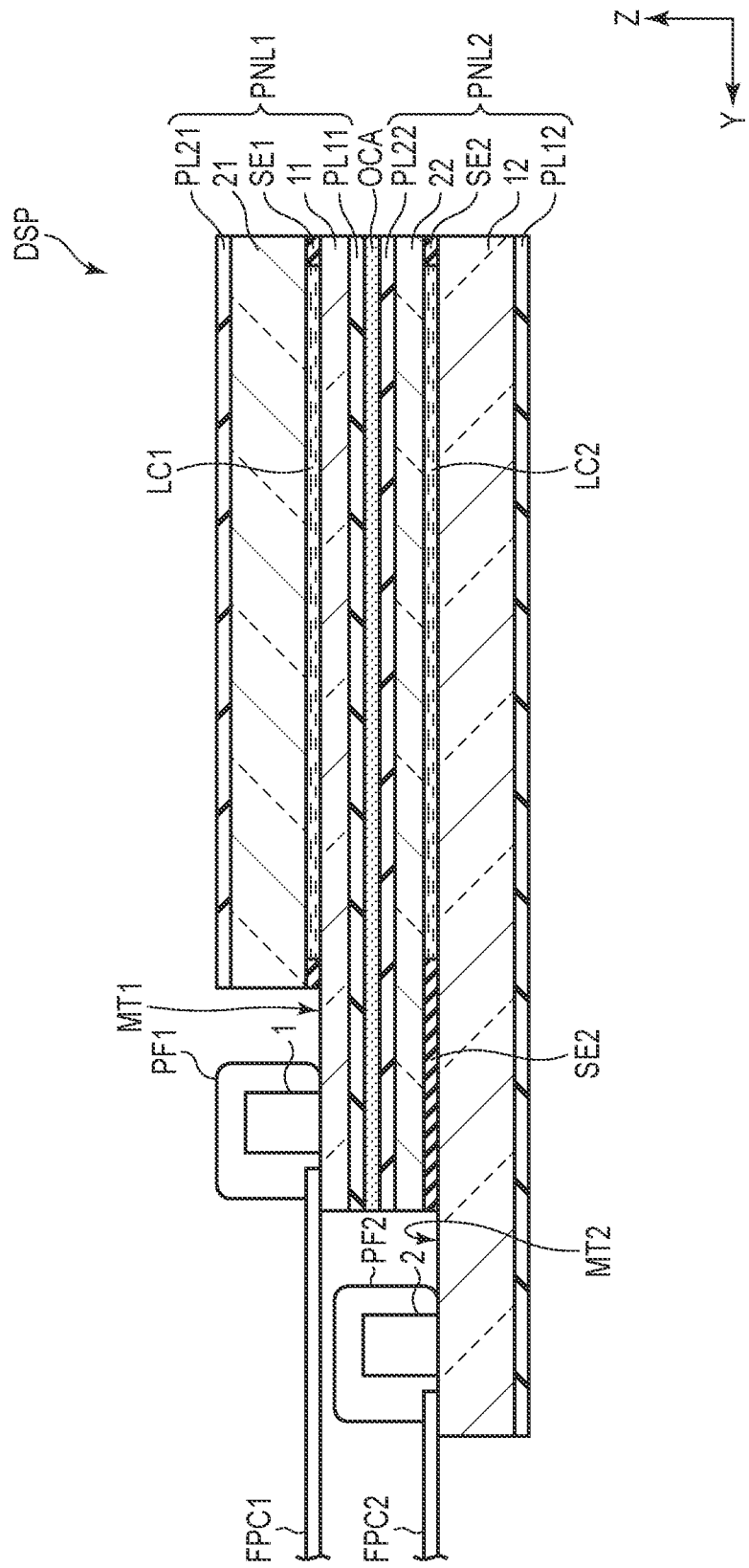
F I G. 5

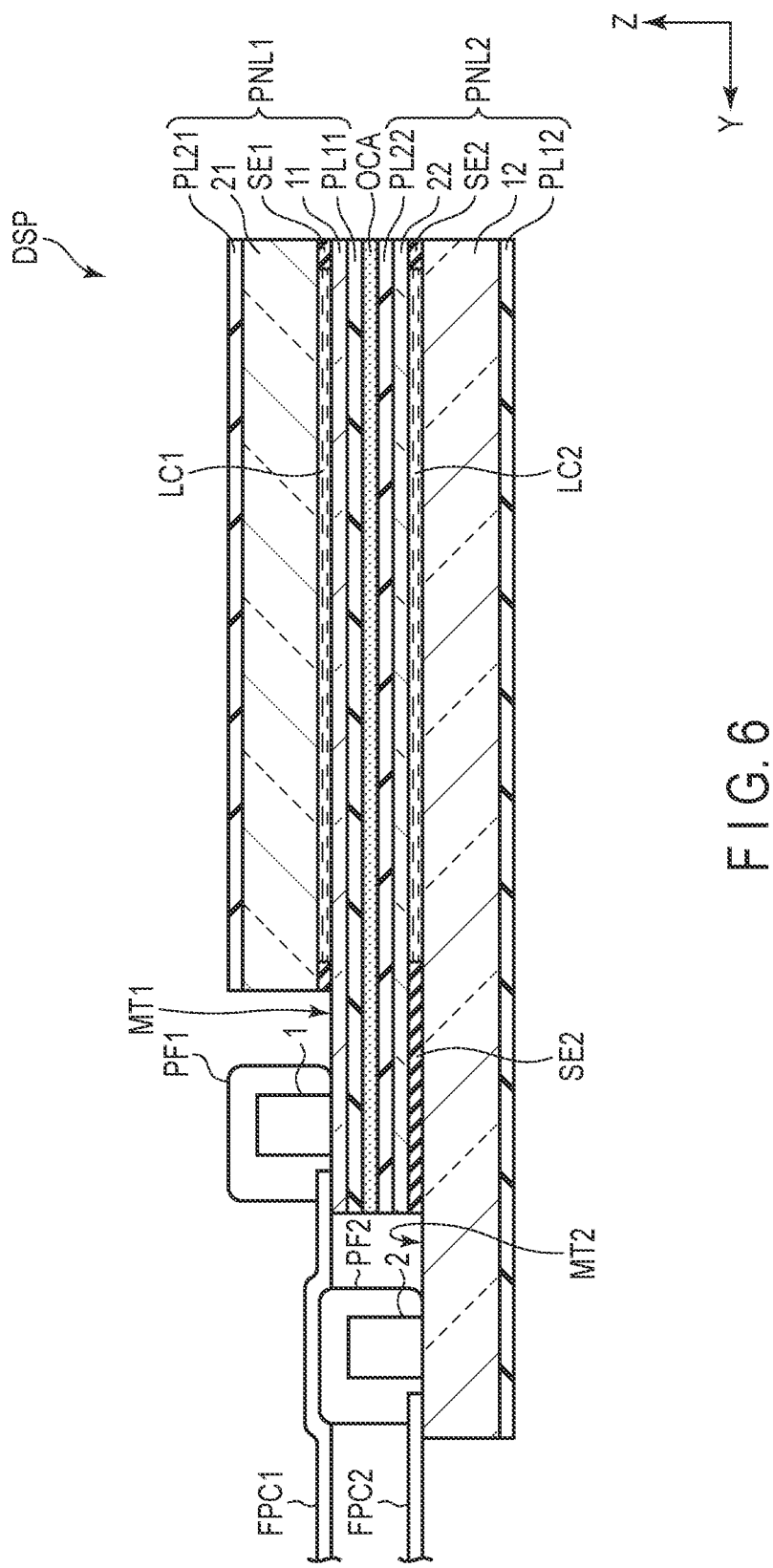
F I G. 6

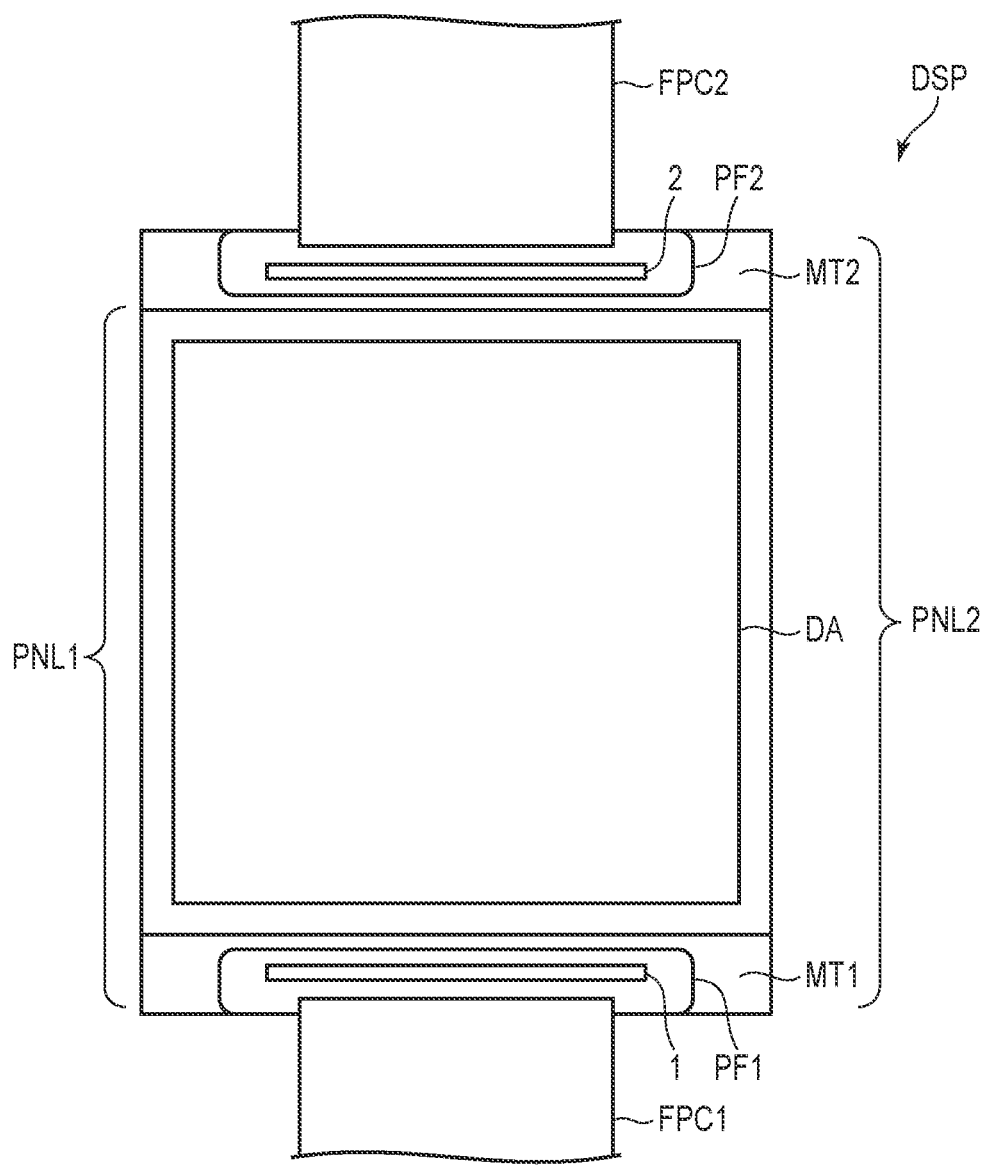
F I G. 10

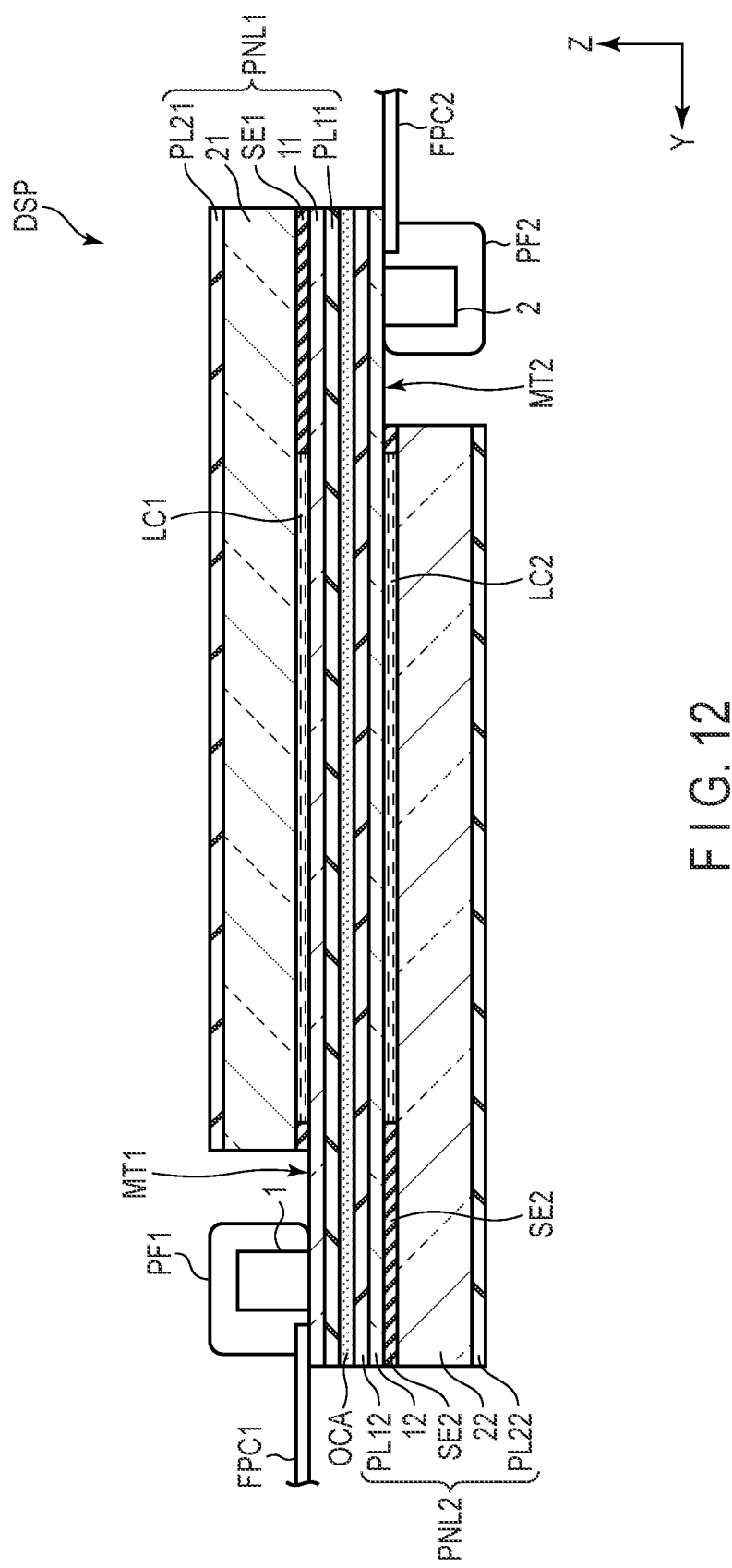
F I G. 12

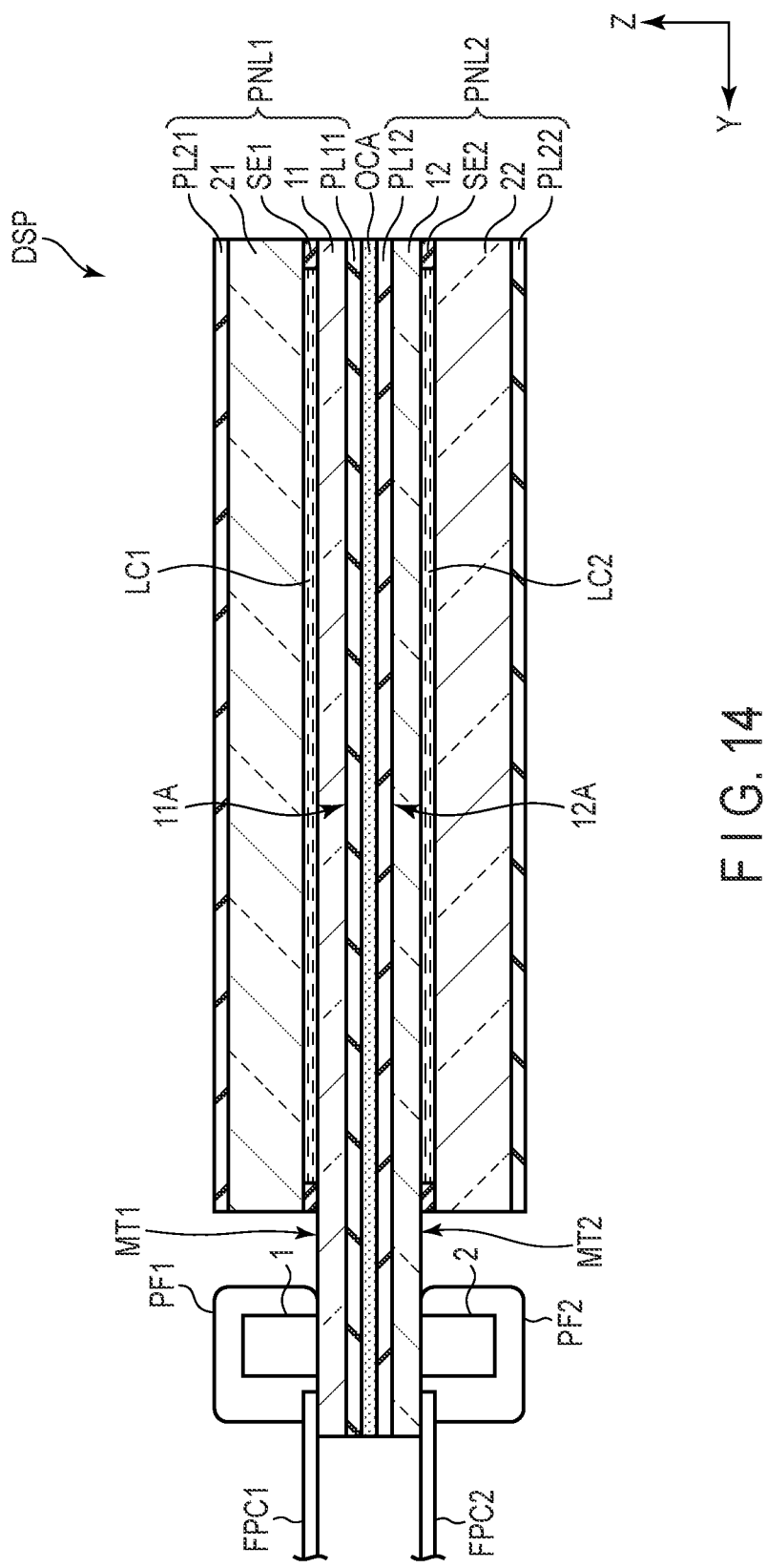
F I G. 14

DISPLAY DEVICE

CROSS-REFERENCE TO RELATED APPLICATIONS

This application is a Continuation application of PCT Application No. PCT/JP2020/044190, filed Nov. 27, 2020 and based upon and claiming the benefit of priority from Japanese Patent Application No. 2020-007665, filed Jan. 21, 2020, the entire contents of all of which are incorporated herein by reference.

FIELD

Embodiments described herein relate generally to a display device.

BACKGROUND

In recent years, in order to improve the contrast of display devices, a technique of using a dimming display panel in addition to image display panel has been developed. However, in such a technique, when a gap between two display panels becomes more distant, influence of parallax becomes more significant, resulting moire (interference fringes) occurring therein, which is a problem.

BRIEF DESCRIPTION OF THE DRAWINGS

FIG. 4 is a cross-sectional view of an example of the structure of the display device in a case where a part of a substrate of the two display panels is thinned.

FIG. 5 is a cross-sectional view of an example of the structure of a display device of an embodiment.

FIG. 6 is a cross-sectional view of an example of the structure of the display device of the embodiment.

FIG. 10 is a plan view of the display device of FIGS. 8 and 9.

FIG. 12 is a cross-sectional view of yet another example of the structure of the embodiment.

FIG. 14 is a cross-sectional view of yet another example of the structure of the embodiment.

DETAILED DESCRIPTION

Figure 1:
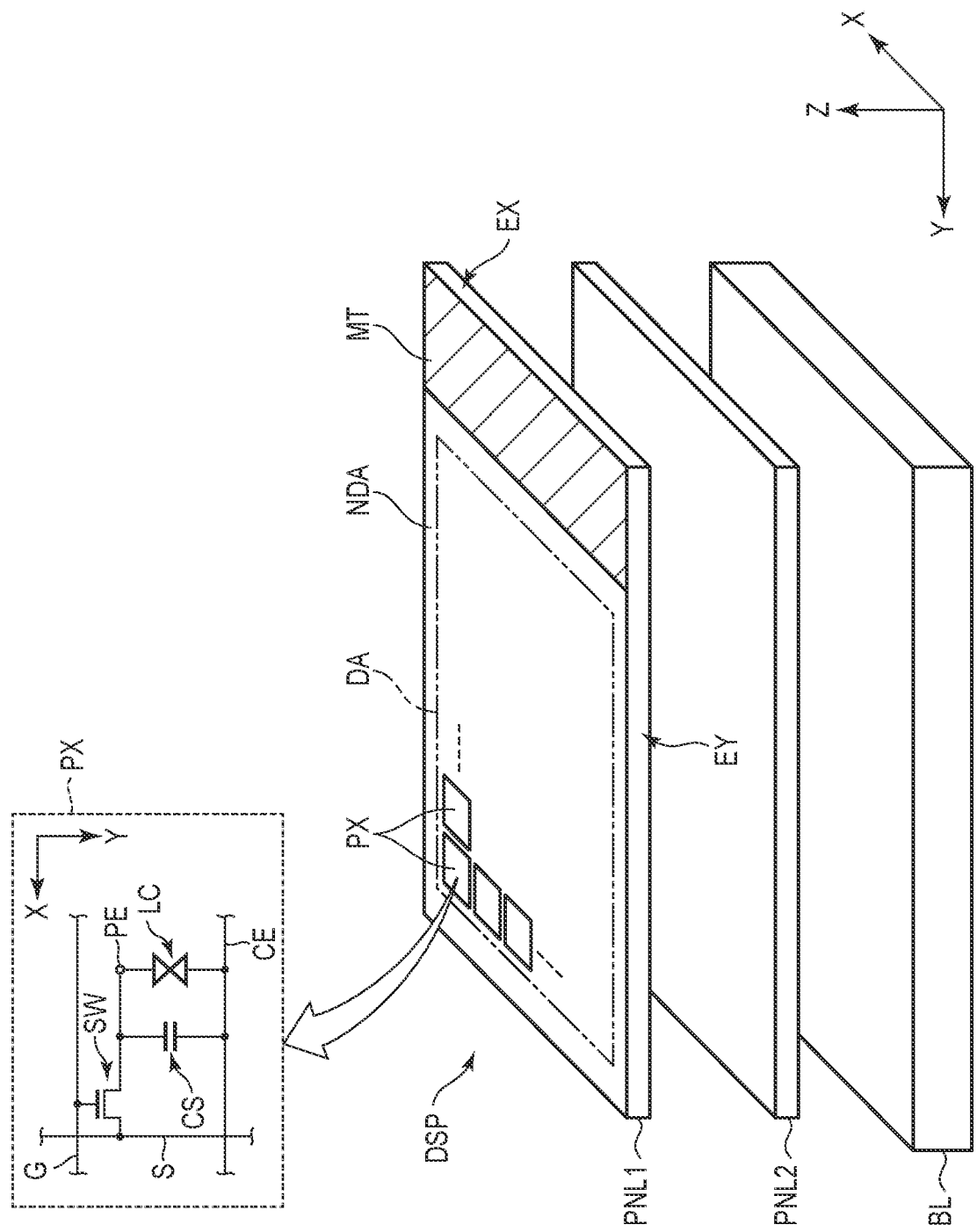
FIG. 1 is a perspective view illustrating an example of the structure of a display device including two display panels, in a disassembled manner.

In general, according to one embodiment, a display device includes a first display panel, a second display panel and an adhesive layer. The first display panel includes a first substrate with a first terminal area in which a first terminal part is formed, and a second substrate which is opposed to the first substrate and has a thickness different from that of the first substrate. The second display panel includes a third substrate with a second terminal area in which a second terminal part is formed, and a fourth substrate which is opposed to the third substrate and has a thickness different from that of the third substrate. The adhesive layer adheres the first display panel and the second display panel. The first terminal area and the second terminal area do not overlap with each other in a plan view.

According to another embodiment, a display device includes a first display panel, a second display panel and an adhesive layer. The first display panel includes a first substrate with a first terminal area in which a first terminal part is formed, and a second substrate which is opposed to the first substrate and has a thickness different from that of the first substrate. The second display panel includes a third substrate with a second terminal area in which a second terminal part is formed, and a fourth substrate which is opposed to the third substrate and has a thickness different from that of the second substrate. The adhesive layer adheres the first substrate of the first display panel and the third substrate of the second display panel.

Embodiments will be described hereinafter with reference to the accompanying drawings.

Note that the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

FIG. 1 is an exploded perspective view schematically showing a configuration of a display device DSP comprising two display panels. FIG. 1 shows a three-dimensional space defined by a first direction X, a second direction Y perpendicular to the first direction and a third direction Z perpendicular to the first direction and the second direction Y. Note that the first direction X, the second direction Y and the third direction Z are orthogonal to each other, but may intersect at an angle other than ninety degrees. In the following descriptions, the third direction Z is defined as an "upward" direction and a direction opposite to the third direction Z is defined as a "downward" direction. Further, with such expressions "a second member above a first member" and "a second member below a first member", the second member may be in contact with the first member or may be remote from the first member. In the latter case, a third member may be interposed between the first member and the second member. In addition, it is assumed that there is an observation position to observe the display device DSP on a tip side of an arrow in a third direction Z, and viewing from this observation position toward the X-Y plane defined by the first direction X and the second direction Y is referred to as a planar view.

As in FIG. 1, the display device DSP includes a liquid crystal display panel PNL1, dimming panel PNL2, and backlight unit BL. As in FIG. 1, the dimming panel PNL2 is placed between the liquid crystal display panel PNL1 and the backlight unit BL in order to improve the contrast of the image displayed on the liquid crystal display panel PNL1.

The liquid crystal display panel PNL1 is rectangular in one example. In the example depicted, the short side EX of the liquid crystal display panel PNL1 is parallel to the first direction X, and the long side EY of the liquid crystal display panel PNL1 is parallel to the second direction Y. The third direction Z corresponds to the thickness direction of the liquid crystal display panel PNL1. The main surface of the liquid crystal display panel PNL1 is parallel to the X-Y plane defined by the first direction X and the second direction Y. The liquid crystal display panel PNL1 includes a display area DA and a non-display area NDA which is positioned outside the display area DA. The non-display area NDA has a terminal area MT in which a driver IC or a flexible printed circuit board is mounted. In FIG. 1, the terminal area MT is hatched.

The display area DA is an area for displaying images and includes a plurality of pixels PX arranged in a matrix, for example. As shown enlarged in FIG. 1, each pixel PX is arranged in the area defined by scanning lines G and signal lines S, and is equipped with a switching element SW, pixel electrode PE, common electrode CE, liquid crystal layer LC, and the like.

The switching element SW is composed of a thin-film transistor (TFT), for example, and is electrically connected to the scanning line G and the signal line S. The scanning line G is electrically connected to the switching element SW in each of the pixels PX aligned in the first direction X. The signal line S is electrically connected to the switching element SW in each of the pixels PX aligned in the second direction Y. The pixel electrode PE is electrically connected to the switching element SW. Each of the pixel electrodes PE is opposed to the common electrode CE, and the liquid crystal layer LC is driven by the electric field generated between the pixel electrode PE and the common electrode CE. The capacitance CS is generated, for example, between the electrode with the same potential as the common electrode CE and the electrode with the same potential as the pixel electrode PE.

The terminal area MT extends along the short side EX of the liquid crystal display panel PNL1. A terminal part is formed in the terminal area MT and the liquid crystal display panel PNL1 is electrically connected to an external device such as a flexible printed circuit board through the terminal part.

Although the detailed structure is not depicted in FIG. 1, the dimming panel PNL2 has basically the same structure as the liquid crystal display panel PNL1. Note that partial differences between liquid crystal display panel PNL1 and dimming panel PNL2 will be described in FIG. 2 below.

The backlight unit BL is located below the dimming panel PNL2, and images are displayed by controlling the light from the backlight unit BL for each pixel PX.

Figure 2:
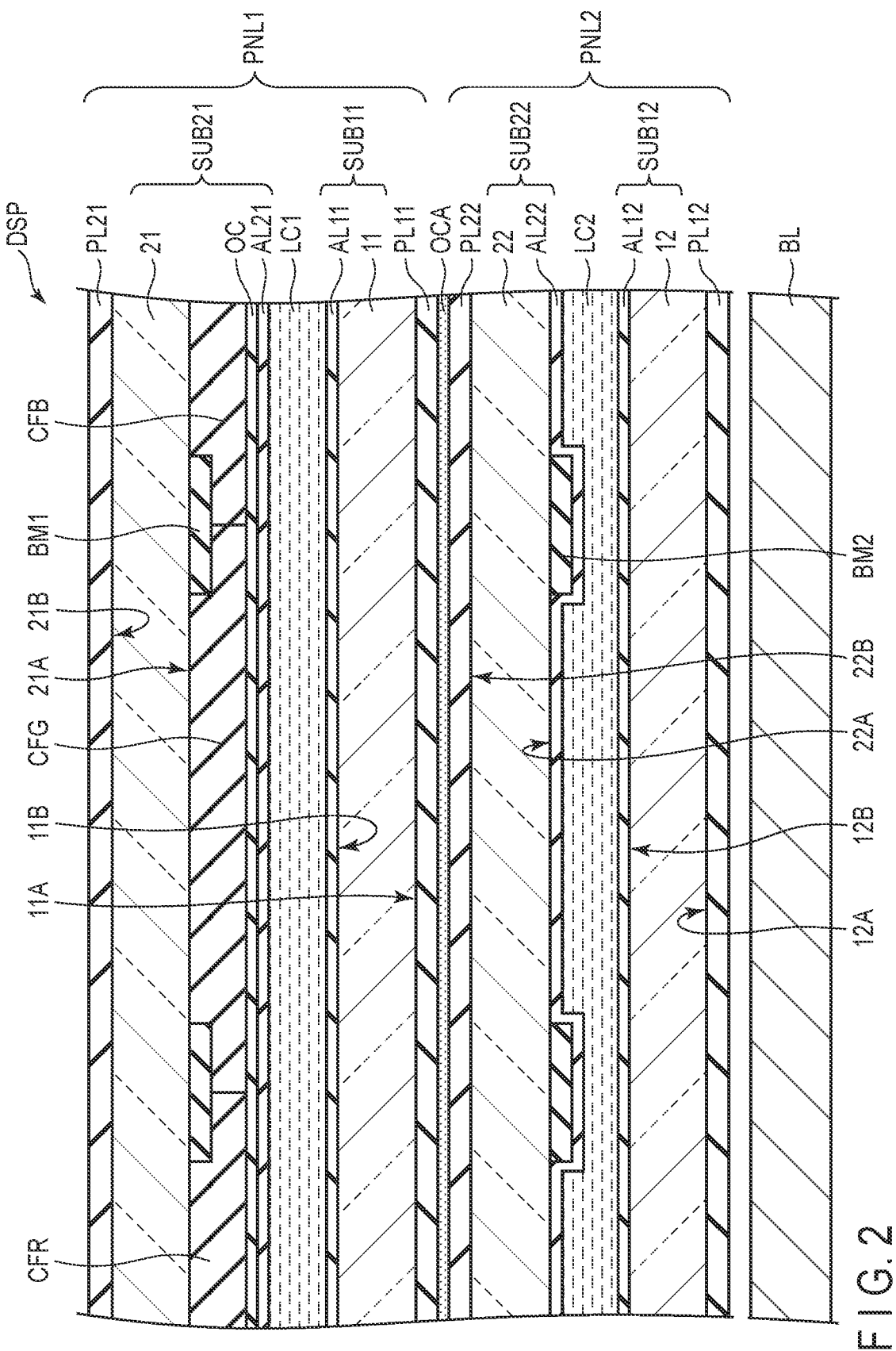
FIG. 2 is a schematic cross-sectional view of the structure of the display device of FIG. 1.

FIG. 2 is a schematic cross-sectional view of the display device DSP of FIG. 1.

As described above, the display device DSP includes a liquid crystal display panel PNL1, dimming panel PNL2, and backlight unit BL.

First, the structure of the liquid crystal display panel PNL1 will be described.

As in FIG. 2, the liquid crystal display panel PNL1 includes the first substrate SUB11, second substrate SUB21, liquid crystal layer LC1, first polarizer PL11, and a second polarizer PL21.

The liquid crystal layer LC1 is held between the first substrate SUB11 and the second substrate SUB21 and sealed by a seal which is not shown. The polarization axes of the first polarizer PL11 and the second polarizer PL 21 are, for example, in a cross-Nicol relationship, i.e., 90 degrees.

As in FIG. 2, the first substrate SUB11 includes a first transparent substrate 11 and an alignment film AL11. The first substrate SUB11 includes, in addition to the above-mentioned structure, the scanning line G and the signal line S of FIG. 1, a switching element SW, pixel electrode PE, common electrode CE, etc., which are not shown in FIG. 2.

The first transparent substrate 11 includes a main surface (lower surface) 11A and a main surface (upper surface) 11B in the opposite side of the main surface 11A. In the main surface 11B side of the first transparent substrate 11, there are scanning lines G and signal lines S, switching element SW, pixel electrode PE, common electrode CE, etc., which are not shown. In the main surface 11B side of the first transparent substrate 11, an alignment film AL11 is further provided contacting the liquid crystal layer LC1. The first polarizer PL11 is adhered to the main surface 11A side of the first transparent substrate 11.

As in FIG. 2, the second substrate SUB21 includes a second transparent substrate 21, light shielding film BM1, color filter CF, overcoat film OC, and alignment film AL21.

The second transparent substrate 21 includes a main surface (lower surface) 21A and a main surface (upper surface) 21B in the opposite side of the main surface 21A. The main surface 21A of the second transparent substrate 21 is opposed to the main surface 11B of the first transparent substrate 11. The light shielding film BM1 is provided in the main surface 21A side of the second transparent substrate 21, and defines each pixel PX as with the scanning lines G and the signal lines S. The color filter CF partially overlaps with the light-shielding film BM1. The color filter CF includes a red color filter CFR, green color filter CFG, blue color filter CFB, etc. The overcoat film OC covers the color filter CF. The overcoat film OC can prevent the pigments of the color filter CF from leaching into the liquid crystal layer LC1. The alignment film AL21 covers the overcoat film OC and is in contact with the liquid crystal layer LC1. The second polarizer PL21 is adhered to the main surface 21B side of the second transparent substrate 21.

The first transparent substrate 11 and the second transparent substrate 21 may be insulating substrates such as glass substrates or plastic substrates. The light shielding film BM1 is preferably formed with a black resin in which black pigment or the like is dispersed. The alignment films AL11 and AL21 are horizontal alignment films having an alignment restriction force which is substantially parallel to the X-Y plane. The alignment restriction force may be imparted by rubbing treatment or by photo-alignment treatment.

Next, the structure of the dimming panel PNL2 will be described.

As in FIG. 2, the dimming panel PNL2 includes, as with the liquid crystal display panel 1, a first substrate SUB12, second substrate SUB22, liquid crystal layer LC2, first polarizer PL12, and second polarizer PL22.

The liquid crystal layer LC2 is held between the first substrate SUB12 and the second substrate SUB22 and sealed by a seal which is not shown. The polarization axes of the first polarizer PL12 and the second polarizer PL22 are in a cross-Nicol relationship, i.e., at 90 degrees. In addition, the polarization axis of the first polarizer PL11 of the liquid crystal display panel PNL1 and the polarization axis of the second polarizer PL22 of the dimming panel PNL2 are in the same direction.

As in FIG. 2, the first substrate SUB12 includes a first transparent substrate 12 and an alignment film AL12. In addition to the above-mentioned structure, the first substrate SUB12 includes, as with the liquid crystal display panel PNL1, scanning lines G, signal lines S, switching element SW, Pixel electrode PE, common electrode CE, etc., which are not shown in FIG. 2.

The first transparent substrate 12 includes a main surface (lower surface) 12A and a main surface (upper surface) 12B in the opposite side of the main surface 12A. In the main surface 12B side of the first transparent substrate 12, there are scanning lines G and signal lines S, switching element SW, pixel electrode PE, common electrode CE, and the like, which are not shown. In the main surface 12B side of the first transparent substrate 12, an alignment film AL12 contacting the liquid crystal layer LC2 is further provided. In the main surface 12A side of the first transparent substrate 12, the first polarizer PL12 is adhered.

As in FIG. 2, the second substrate SUB22 includes a second transparent substrate 22, light shielding film BM2, and alignment film AL22. The dimming panel PNL2 is different from the liquid crystal display panel PNL1 because the purpose thereof is to control brightness, unlike the liquid crystal display panel PNL1, and because it does not need to generate a color image, no color filter CF is provided in the second substrate SUB22 of the dimming panel PNL2. Furthermore, the dimming panel PNL2 differs from the liquid crystal display panel PNL1 because no overcoat film OC is provided therewith. This is because the color filter CF is not provided as described above, and also there is no need to prevent pigments (resin) from leaching into the liquid crystal layer LC2 in accordance with the light shielding film BM2 formed of an opaque metallic material instead of black resin, which will be described in detail later.

The second transparent substrate 22 includes a main surface (lower surface) 22A and a main surface (upper surface) 22B in the opposite side of the main surface 22A. The main surface 22A of the second transparent substrate 22 is opposed to the main surface 12B of the first transparent substrate 12. The light shielding film BM2 is provided with the main surface 22A side of the second transparent substrate 22 and defines, as with the scanning line G and the signal line S, each pixel PX. The light shielding film BM2 is, unlike the light shielding film BM1 of the liquid crystal display panel PNL1, preferably formed of an opaque metallic material such as molybdenum (Mo), aluminum (Al), tungsten (W), titanium (Ti), and silver (Ag). The alignment film AL22 covers the light shielding film BM2 and is in contact with the liquid crystal layer LC2. In the main surface 22B side of the second transparent substrate 22, the second polarizer PL22 is adhered.

The first transparent substrate 12 and the second transparent substrate 22 are insulating substrates such as glass substrates or plastic substrates. The alignment films AL12 and AL22 are horizontal alignment films having an alignment restriction force which is substantially parallel to the X-Y plane. The orientation restriction force may be imparted by rubbing process or by photo alignment process.

The liquid crystal display panel PNL1 and the dimming panel PNL2 are adhered by a transparent adhesive layer OCA, for example. Note that the common structures of the liquid crystal display panel PNL1 and the dimming panel PNL2 (for example, light-shielding film BM1 and light-shielding film BM2) are positioned such that they overlap with each other in a plan view, and are adhered to each other by the adhesive layer OCA.

The backlight unit BL is positioned below the dimming panel PNL2. As the backlight unit BL, various types of backlight units are available, such as those using light-emitting diodes (LEDs) as the light source, those using cold cathode fluorescent lamps (CCFLs) as the light source, and so on. Although omitted in FIG. 2, a cover member and the like may further be placed on the second polarizer PL21 of the liquid crystal display panel PNL1.

Figure 3:
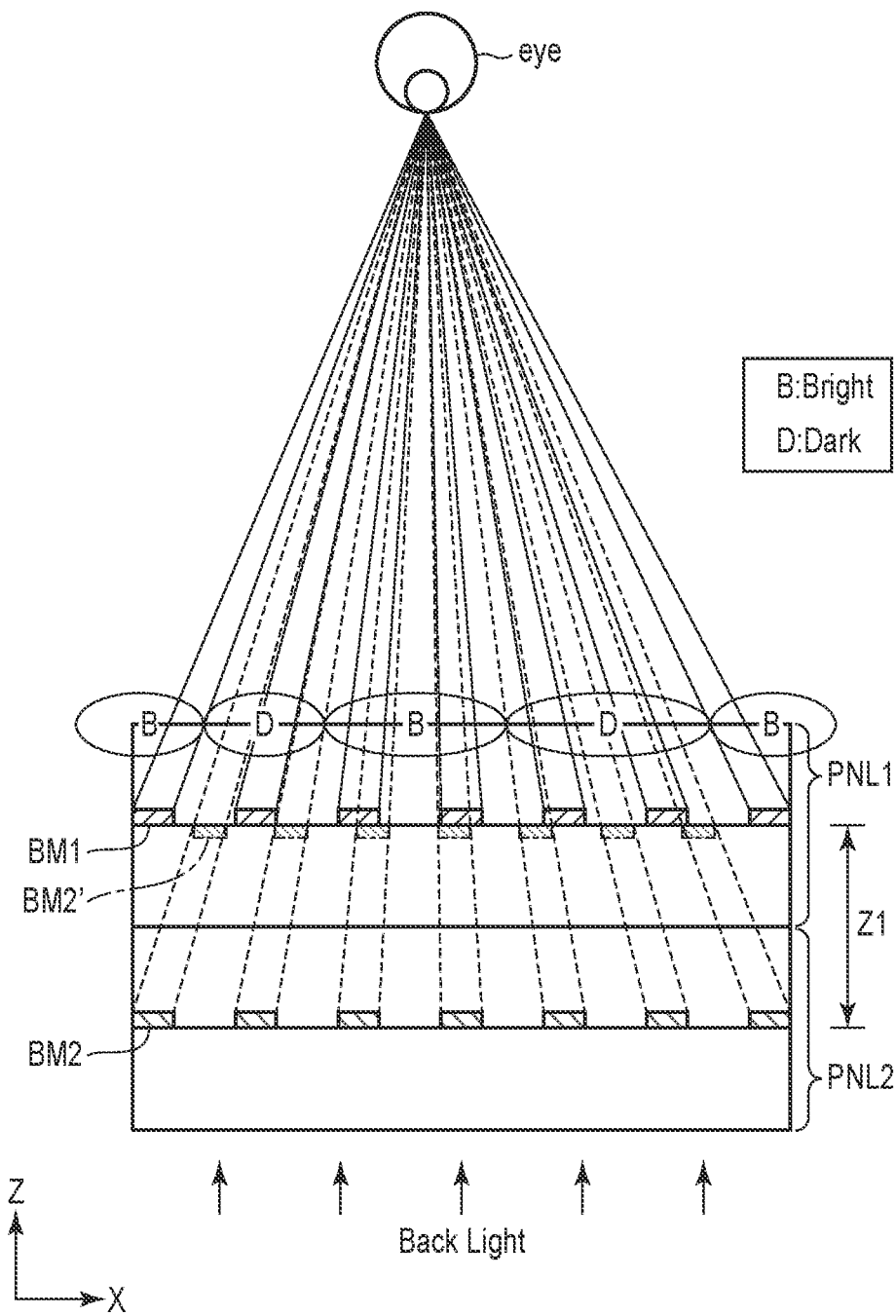
FIG. 3 is a schematic view illustrating moire which may be generated in the display device of FIG. 1.

FIG. 3 is a schematic diagram to illustrate moire (interference fringes) which may occur in the display device DSP of FIG. 1.

As in FIG. 3, the light-shielding film BM1 of the liquid crystal display panel PNL1 and the light-shielding film BM2 of the dimming panel PNL2 are positioned such that they overlap with each other in a plan view. Therefore, when an drawn eye in FIG. 3 looks directly downward, only the light-shielding film BM1 of the liquid crystal display panel PNL1 is in the field of view. On the other hand, when looking at a diagonal direction, only the light-shielding film BM1 of the liquid crystal display panel PNL1 and the light-shielding film BM2 of the dimming panel PNL2 are positioned apart by a gap Z1 in the third direction Z (hereinafter referred to as inter-panel gap), and thus, as in FIG. 3, not only the light-shielding film BM1 of the liquid crystal display panel PNL1 but also the light-shielding film BM2 of the dimming panel PNL2 enter the field of view. This will be referred to as parallax effect.

In FIG. 3, for easier understanding of the influence of the parallax effect upon brightness/darkness, how the light-shielding film BM2 of the dimming panel PNL2 is recognized in the position of the light-shielding film BM1 of the liquid crystal display panel PNL1 is indicated by a single dotted line and referred to as BM2'. Furthermore, in FIG. 3, line of sight with respect to the light-shielding film BM1 of the liquid crystal display panel PNL1 is indicated by a solid line, and line of sight with respect to the light-shielding film BM2 of the dimming panel PNL2 is indicated by a dotted line.

In FIG. 3, the area depicted as field of view B (Bright) is the area where the light shielding film (a set of light shielding films BM1 and BM2') is sparse and bright. On the other hand, the area depicted as field of view D (Dark) is the area where the light shielding film (a set of light shielding films BM1 and BM2') is dense and dark. That is, according to FIG. 3, depending on the viewing angle, bright and dark areas exist repeatedly, resulting in moire.

The occurrence of moire shown in FIG. 3 is detrimental to display quality. For this reason, it has been considered to suppress the occurrence of moire by reducing the inter-panel gap mentioned above as much as possible. In order to reduce the inter-panel gap, there are proposed methods in which the substrates of the liquid crystal display panel PNL1 and the dimming panel PNL2 are partially polished to be thinner, or in which the substrates are partially shaped as sheets to be thinner.

However, on the other hand, if the substrates of liquid crystal display panel PNL1 or dimming panel PNL2 are partially thinned, the following inconvenience may occur. In the following, the inconvenience will be first explained with reference to FIG. 4.

FIG. 4 is a cross-sectional view illustrating an example of the schematic structure of the display device DSP in a case where the substrates of the liquid crystal display panel PNL1 and the dimming panel PNL2 are partially thinned. Note that, in FIG. 4, as to the liquid crystal display panel PNL1, structures other than the first transparent substrate 11, second transparent substrate 21, liquid crystal layer LC1, seal SE1, first polarizer PL11, and second polarizer PL21 are omitted. Similarly, in FIG. 4, as to the dimming panel PNL2, structures other than the first transparent substrate 12, second transparent substrate 22, liquid crystal layer LC2, seal SE2, first polarizer PL12, and second polarizer PL22 are omitted. Furthermore, in FIG. 4, the backlight unit BL of the display device DSP is omitted.

FIG. 4 illustrates a case where the first transparent substrate 11 of the liquid crystal display panel PNL1 and the second transparent substrate 22 of the dimming panel PNL2 are polished to reduce the inter-panel gap therebetween and the substrates 11 and 22 are thinner than the second transparent substrate 21 of liquid crystal display panel PNL1 and the first transparent substrate 12 of the dimming panel PNL2. Specifically, illustrates is a case where the second transparent substrate 21 of the liquid crystal display panel PNL1 and the first transparent substrate 12 of the dimming panel PNL2 are 0.5 mm in thickness whereas the first transparent substrate 11 of the liquid crystal display panel PNL1 and the second transparent substrate 22 of the dimming panel PNL2 are 0.15 mm in thickness. Note that the first polarizing panels PL11 and PL12 and the second polarizers PL21 and PL22 are, for example, 0.07 mm in thickness, and the adhesive layer OCA is, for example, 0.03 mm in thickness.

According to the structure of FIG. 4, the inter-panel gap can be reduced by the thinned portion of the first transparent substrate 11 of the liquid crystal display panel PNL1 and the second transparent substrate 22 of the dimming panel PNL2, and thus, the generation of moire can be suppressed.

However, on the other hand, because the first transparent substrate 11 of the liquid crystal display panel PNL1 and the second transparent substrate 22 of the dimming panel PNL2 are made thinner, as in FIG. 4, the protection film PF2 covering, for example, the driver IC2 and the flexible printed circuit board FPC2 mounted on the terminal area MT2 of the dimming panel PNL2 and the terminal part formed in the terminal area MT2 may contact with the first transparent substrate 11 of the liquid crystal display panel PNL1. Note that, in FIG. 4, a case where the thickness of the protection film PF2 is 0.3 mm is considered.

If the protection film PF2 contacts with the transparent substrate 11 of the liquid crystal display panel PNL1, the liquid crystal display panel PNL1 and the dimming panel PNL2 cannot be adhered together, and the display device DSP cannot be configured.

Therefore, a display device DSP in which the inter-panel gap is reduced to suppress the generation of moire while the structure mounted on the terminal area MT2 of the dimming panel PNL2 does not contact (interfere) the structure of the liquid crystal panel PNL1 is desired.

FIG. 5 is a cross-sectional view illustrating an example of the schematic structure of the display device DSP of the present embodiment. Note that, in FIG. 5, as in FIG. 4, as to the liquid crystal display panel PNL1, structures other than the first transparent substrate 11, second transparent substrate 21, liquid crystal layer LC1, seal SE1, first polarizer PL1, and second polarizer PL21 are omitted. Similarly, in FIG. 5, as to the dimming panel PNL2, structures other than the first transparent substrate 12, second transparent substrate 22, liquid crystal layer LC2, seal SE2, first polarizer PL12, and second polarizer PL22 are omitted. Furthermore, in FIG. 5, the backlight unit BL of the display device DSP is omitted.

As in FIG. 5, in the display device DSP of the present embodiment, the first transparent substrate 11 of the liquid crystal display panel PNL1 and the second transparent substrate 22 of the dimming panel PNL2 are matched in size to arrange the terminal area MT1 of the liquid crystal display panel PNL1 and the terminal area MT2 of the dimming panel PNL2 not to overlap with each other in a plan view. That is, the first transparent substrate 11 of the liquid crystal display panel PNL1 has a length in the second direction Y, which is shorter than a length in the second direction Y of the first transparent substrate 12 of the dimming panel PNL2 and which is the same or substantially the same as a length in the second direction Y of the second transparent substrate 22 of the dimming panel PNL2.

Note that the terminal area MT1 of the liquid crystal display panel PNL1 and the terminal area MT2 of the dimming panel PNL2 are arranged to not overlap in a plan view while the liquid crystal layer LC1 of the liquid crystal display panel PNL1 and the liquid crystal layer LC2 of the dimming panel PNL2 need to overlap with each other in a plan view. Thus, the length of the seal SE2 in the second direction Y in the terminal area MT2 side of the dimming panel PNL2 is longer than a length in the second direction Y of the other seal SE2 and than a length in the second direction Y of the seal SE1 of the liquid crystal display panel PNL1. That is, the seal SE1 of the liquid crystal display panel PNL1 and the seal SE2 of the dimming panel PNL2 are not at least partially overlapping in a plan view.

According to the structure of FIG. 5, the terminal area MT1 of the liquid crystal display panel PNL1 and the terminal area MT2 of the dimming panel PNL2 are arranged not to overlap in a plan view, and thus, the protection film PF2 placed on the terminal area MT2 of the dimming panel PNL2 can be prevented from contacting the first transparent substrate 11 of the liquid crystal display panel PNL1. Furthermore, as with the case of FIG. 4, the first transparent substrate 11 of the liquid crystal display panel PNL1 and the second transparent substrate 22 of the dimming panel PNL2 are polished to be thinner in the structure of FIG. 5, and thus, the inter-panel gap is decreased, by which the generation of moire can be suppressed.

Note that, as in FIG. 6, even when the first transparent substrate 11 of the liquid crystal display panel PNL1 and the second transparent substrate 22 of the dimming panel PNL2 are made thinner (e.g., 0.01 mm) by sheeting instead of polishing, the protection film PF2 placed on the terminal area MT2 of the dimming panel PNL2 can be prevented from contacting the first transparent substrate 11 of the liquid crystal display panel PNL1, and the same effect achievable in the structure of FIG. 5 can be obtained.

Note that, in the case of the structure of FIG. 6, depending on the thicknesses of the first transparent substrate 11 of the liquid crystal display panel PNL1 and the second transparent substrate 22 of the dimming panel PNL2 in the sheet-shape, there may be a case where the flexible printed circuit board FPC1 mounted on the terminal area MT1 of the liquid crystal display panel PNL1 contacts the protection film PF2. However, since the flexible printed circuit board FPC1 has excellent flexibility, even if it contacts the protection film PF2, it will bend and simply cover the protection film PF2. Thus, the liquid crystal display panel PNL1 and the dimming panel PNL2 can be adhered.

Figure 7:
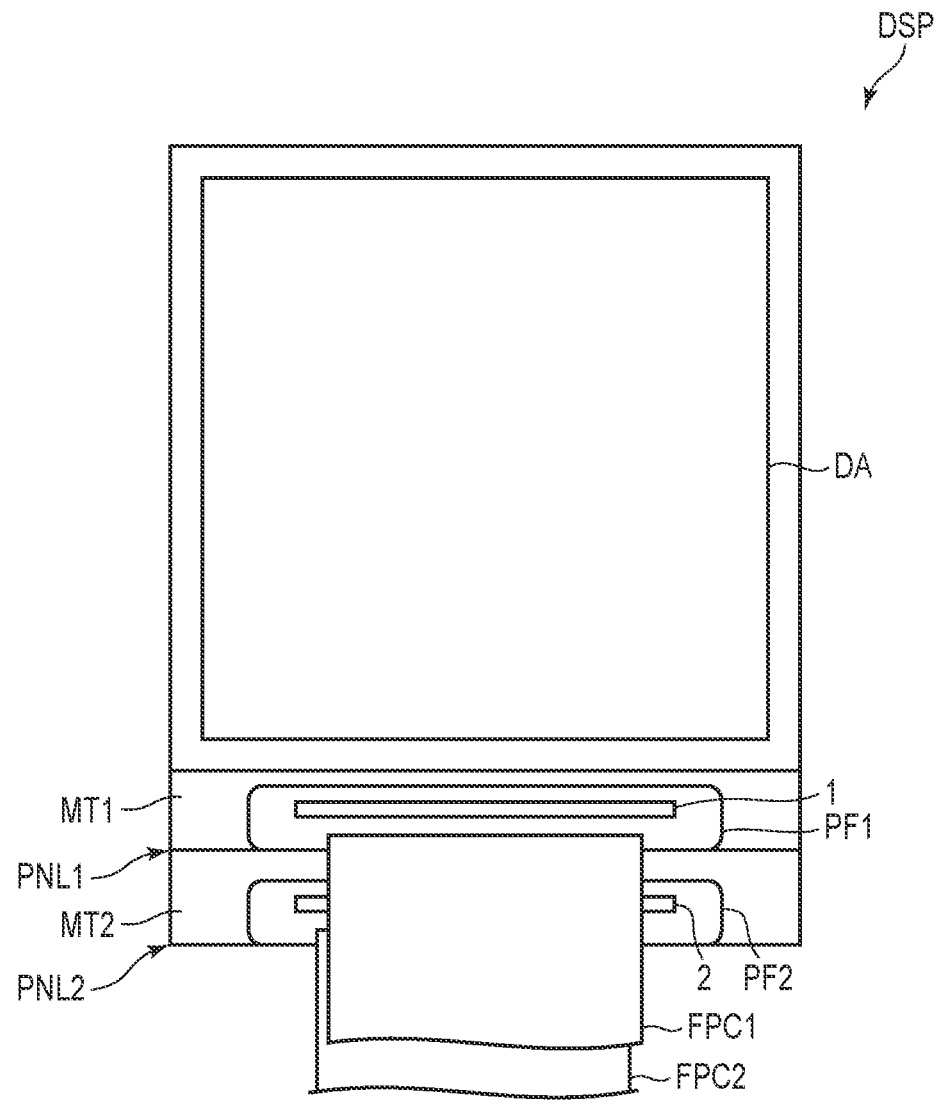
FIG. 7 is a plan view of the display device of FIGS. 5 and 6.

FIG. 7 is a plan view illustrating the display device DSP structured as in FIGS. 5 and 6.

In the case of the structures of FIGS. 5 and 6, as in FIG. 7, the terminal area MT1 of the liquid crystal display panel PNL1 and the terminal area MT2 of the dimming panel PNL2 extend in the same direction. Therefore, the flexible printed circuit board FPC1 mounted on the terminal area MT1 of the liquid crystal display panel PNL1 and the flexible printed circuit board FPC2 mounted on the terminal area MT2 of the dimming panel PNL2 extends in the same direction which is opposite to the display area DA. The terminal area MT1 of the liquid crystal display panel PNL1 and the terminal area MT2 of the dimming panel PNL2 do not overlap in a plan view while the flexible printed circuit boards FPC1 and FPC2 mounted on the terminal areas MT1 and MT2 partially overlap with each other in a plan view.

According to the above-described display device DSP of the present embodiment, even when the first transparent substrate 11 of the liquid crystal display panel PNL1 and the second transparent substrate 22 of the dimming panel PNL2 are polished or formed in the sheet-shape to be thinner in order to suppress the generation of moire (that is, in order to decrease the inter-panel gap), the terminal area MT1 of the liquid crystal panel PNL1 and the terminal area MT2 of the dimming panel PNL2 are arranged not to overlap in a plan view, and thus, possible occurrence of a case where the protection film PF2 on the terminal area MT2 of the dimming panel PNL2 contacts (interferes) the liquid crystal display panel PNL1 and adhesion of the liquid crystal display panel PNL1 and the dimming panel PNL2 becomes impossible can be suppressed.

Furthermore, according to the display device DSP of the present embodiment, the terminal area MT1 of the liquid crystal display panel PNL1 and the terminal area MT2 of the dimming panel PNL2 do not overlap in a plan view, and thus, drivers IC1 and IC2 and flexible printed circuit boards FPC1 and FPC2 can be mounted on the terminal areas MT1 and MT2, respectively, after the adhesion of the liquid crystal display panel PNL1 and the dimming panel PNL2.

If the first transparent substrate 11 to which the terminal area MT1 of the liquid crystal display panel PNL1 extends is formed in a sheet-shape, the first transparent substrate 11 may not be strong enough as a mounting part to which the driver IC1 and the flexible printed circuit board FPC1 are mounted, and may possibly be easily damaged. However, as in FIG. 6, in the display device DSP for the present embodiment, the first transparent substrate 12 of the dimming panel PNL2 is placed below the first transparent substrate 11 in the sheet-shape, and thus, it can be made strong enough to be used as the mounting part as described above.

Furthermore, in the display device DSP of the present embodiment, the dimensions of the first polarizer PL11 of the liquid crystal display panel PNL1 are matched to the dimensions of the first transparent substrate 11 of the liquid crystal display panel PNL1, and thus, the first polarizer PL11 extends to the lower side of the terminal area MT1. According to this, when the liquid crystal display panel PNL1 and the dimming panel PNL2 are adhered, no gap is created below the terminal area MT1, thus realizing a stable structure.

Now, other examples of the structure of the display device DSP of the present embodiment will be explained for each example.

Figure 8:
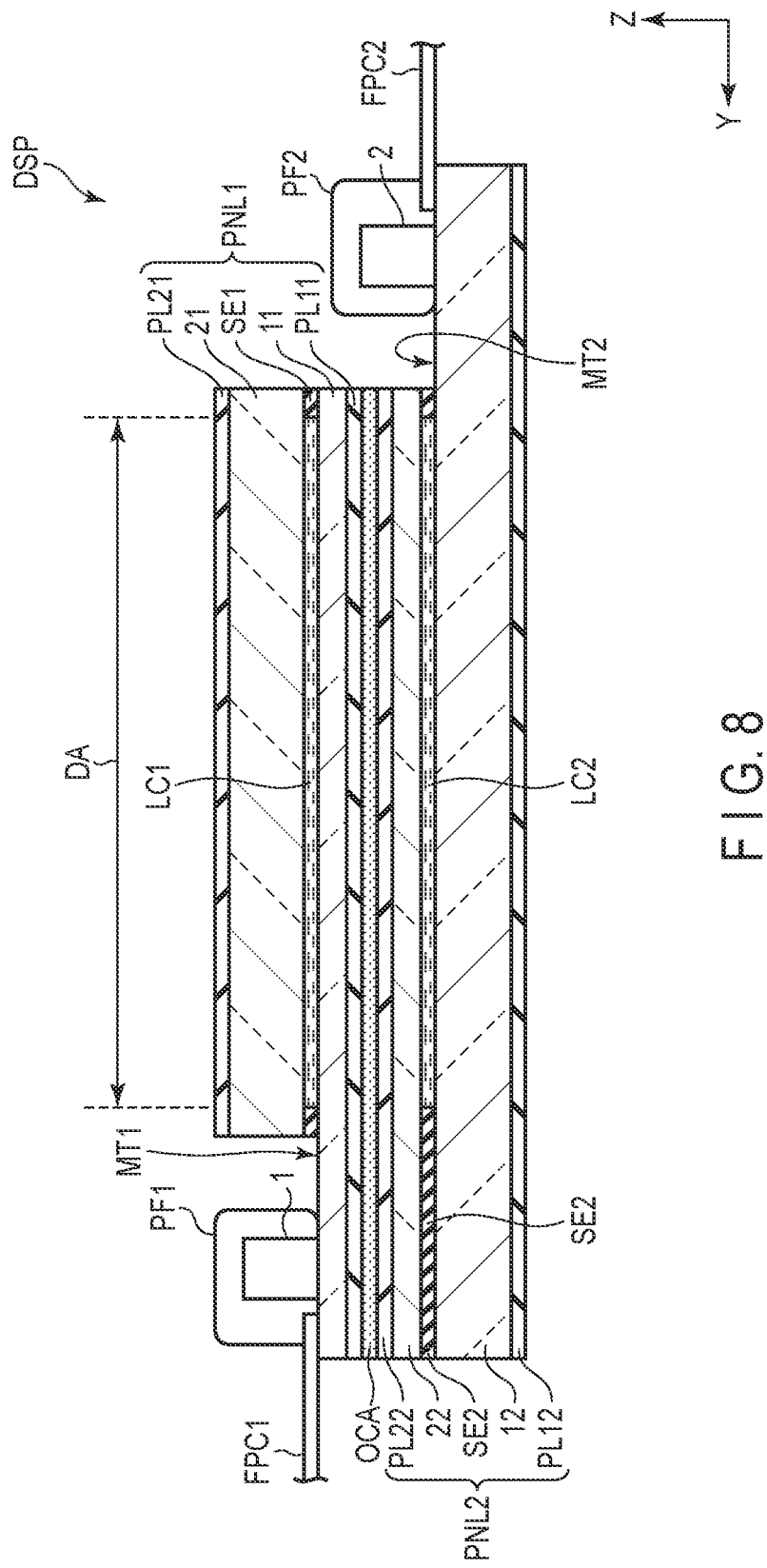
FIG. 8 is a cross-sectional view of another example of the structure of the display device of the embodiment.

FIG. 8 is a cross-sectional view illustrating another example of the schematic structure of the display device DSP of the present embodiment. In each of the cross-sectional views shown below, as in FIGS. 5 and 6 described above, with respect to the liquid crystal display panel PNL1, the first transparent substrate 11, second transparent substrate 21, liquid crystal layer LC1, seal SE1, first polarizer PL11, and second polarizer PL21 are omitted. Similarly, with respect to dimming panel PNL2, the first transparent substrate 12, second transparent substrate 22, liquid crystal layer LC2, seal SE2, first polarizer PL12, and second polarizer PL22 are omitted. Furthermore, the backlight unit BL of the display device DSP is omitted from the depiction.

In the display device DSP of FIG. 8, as with the display device DSP of FIG. 5, the dimensions of the first polarizer PL11 of the liquid crystal display panel PNL1 are matched to the dimensions of the first transparent substrate 11 of the liquid crystal display panel PNL1, and thus, the terminal area MT1 of the liquid crystal display panel PNL1 and the terminal area MT2 of the dimming panel PNL2 are arranged not to overlap in a plan view. On the other hand, in the display device DSP of FIG. 8, the terminal area MT1 of the liquid crystal display panel PNL1 and the terminal area MT2 of the dimming panel PNL2 extend in opposite directions with respect to the display area DA in which the liquid crystal layers LC1 and LC2 are arranged, which is a difference from the structure of FIG. 8.

Furthermore, in the display device DSP of FIG. 8, as with the display device DSP of FIG. 5, the terminal area MT1 of the liquid crystal display panel PNL1 and the terminal area MT2 of the dimming panel PNL2 are arranged not to overlap in a plan view, but the liquid crystal layer LC1 of the liquid crystal display panel PNL1 and the liquid crystal layer LC2 of the dimming panel PNL2 need to overlap with each other in a plan view. Thus, the length of the seal SE2 in the second direction Y, which is in the opposite side of the terminal area MT2 of the dimming panel PNL2 is longer than the length of the other seal SE2 in the second direction Y and the seal SE1 in the second direction Y of the liquid crystal display panel PNL1. That is, in this structure, the seal SE1 of the liquid crystal display panel PNL1 and the seal SE2 of the diming panel PNL2 do not at least partially overlap in a plan view. Note that, FIG. 8 illustrates a case where the first transparent substrate 11 of the liquid crystal display panel PNL1 and the second transparent substrate 22 of the dimming panel PNL2 are thinned by polishing; however, as in FIG. 9, the first transparent substrate 11 of the liquid crystal display panel PNL1 and the second transparent substrate 22 of the dimming panel PNL2 may be made thinner by sheeting.

Figure 9:
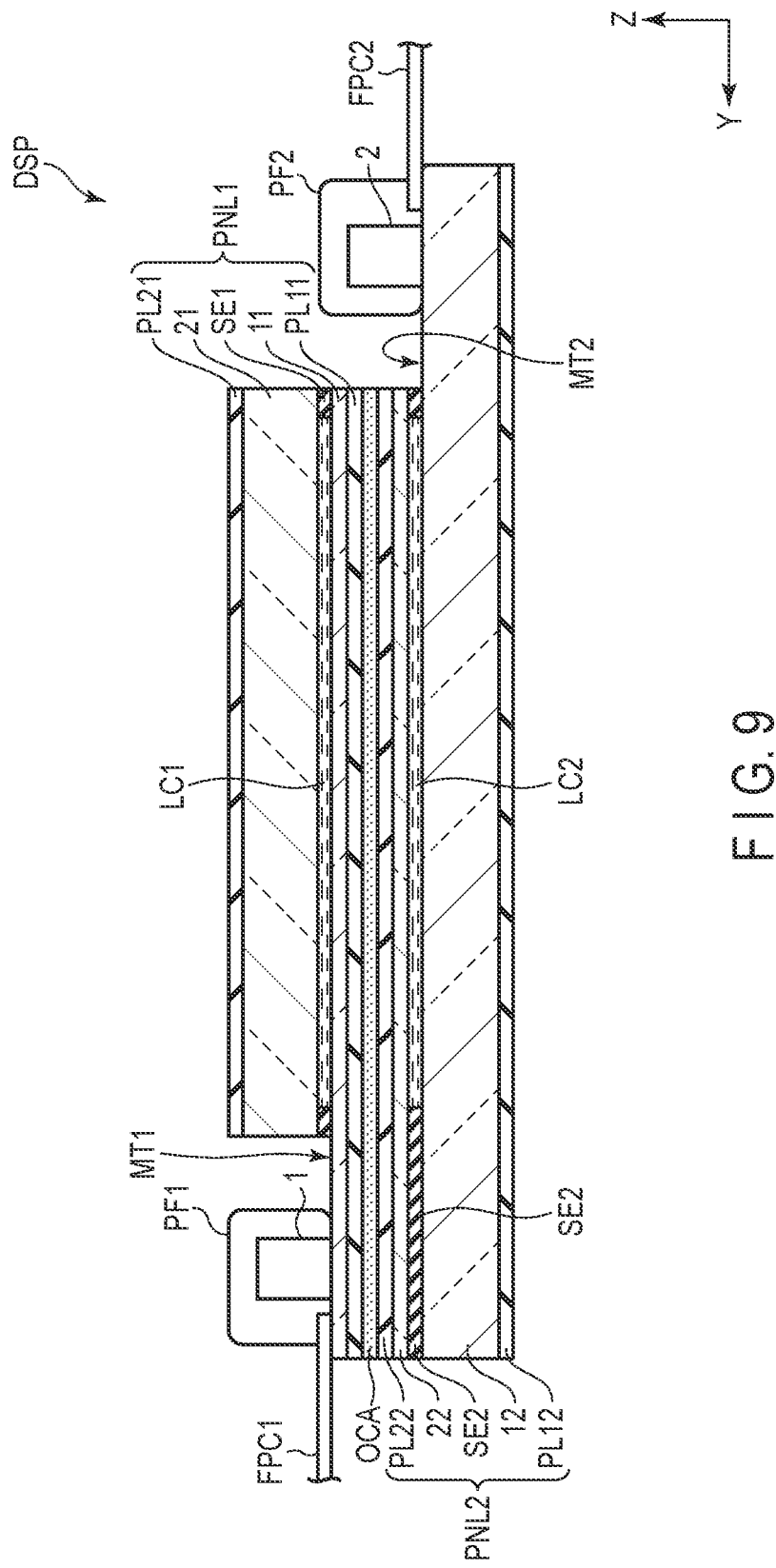
FIG. 9 is a cross-sectional view of another example of the structure of the display device of the embodiment.

FIG. 10 is a plan view illustrating the display device DSP structured as in FIGS. 8 and 9.

In the structures of FIGS. 8 and 9, as in FIG. 10, the terminal area MT1 of the liquid crystal display panel PNL1 and the terminal area MT2 of the dimming panel PNL2 extend in opposite directions across the display area DA. For this reason, the flexible printed circuit board FPC1 mounted on the terminal area MT1 of the liquid crystal display panel PNL1 and the flexible printed circuit board FPC2 mounted on the terminal area MT2 of the dimming panel PNL2 extend in opposite directions across the display area DA.

That is, in this structure, the terminal area MT1 of the liquid crystal display panel PNL1 and the terminal area MT2 of the dimming panel PNL2 do not overlap in a plan view while the flexible printed circuit boards FPC1 and FPC2 mounted on the terminal areas MT1 and MT2, respectively, do not overlap in a plan view.

The structures of FIGS. 8 to 10 as above can achieve the same effects similar to those of the above-described structures of FIGS. 5 to 7.

Figure 11:
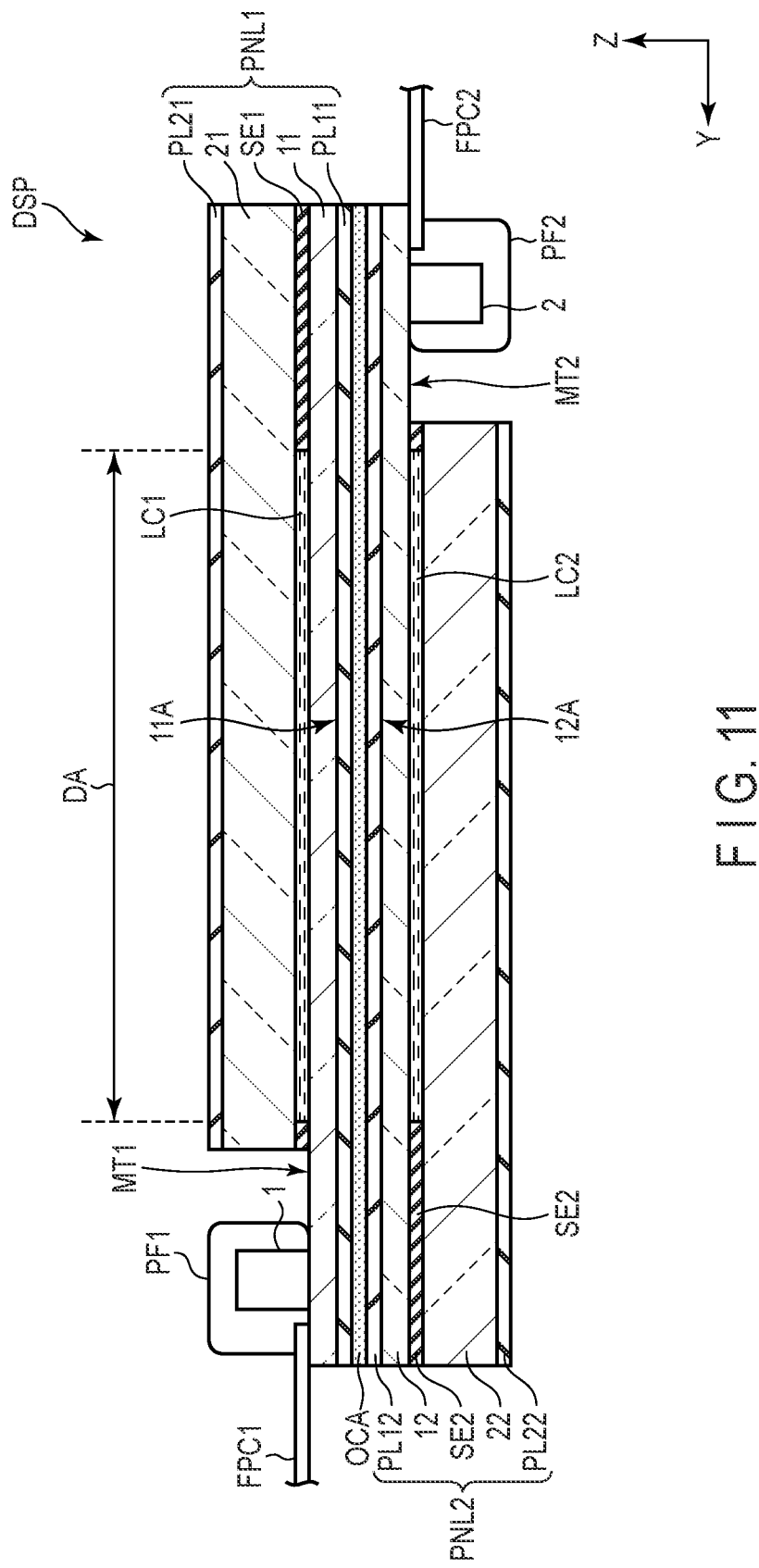
FIG. 11 is a cross-sectional view of yet another example of the structure of the embodiment.

FIG. 11 is a cross-sectional view illustrating another example of the schematic structure of the display device DSP of the present embodiment.

The display device DSP of FIG. 11 includes the dimming panel PNL2 adhered to the liquid crystal display panel PNL1 in a reversed manner, which is different from the structure of FIG. 5. Specifically, in the display device DSP of FIG. 5, the liquid crystal display panel PNL1 and the dimming panel PNL2 are adhered such that the main surface 11A of the first transparent substrate 11 of the liquid crystal display panel PNL1 and the main surface 22B of the second transparent substrate 22 of the dimming panel PNL2 are opposed to each other; however, in the display device DSP of FIG. 11, the liquid crystal display panel PNL1 and the dimming panel PNL2 are adhered such that the main surface 11A of the first transparent substrate 11 of the liquid crystal display panel PNL1 and the main surface 12A of the first transparent substrate 12 of the dimming panel PNL2 are opposed to each other. Furthermore, in the display device DSP of FIG. 11, the terminal area MT1 of the liquid crystal display panel PNL1 and the terminal area MT2 of the dimming panel PNL2 extend in the opposite directions across the display area DA in which the liquid crystal layers LC1 and LC2 are arranged.

Furthermore, in the display device DSP of FIG. 11, as with the display device DSP of FIG. 5, the terminal area MT1 of the liquid crystal display panel PNL1 and the terminal area MT2 of the dimming panel PNL2 are arranged not to overlap in a plan view, but the liquid crystal layer LC1 of the liquid crystal display panel PNL1 and the liquid crystal layer LC2 of the dimming panel PNL2 need to overlap with each other in a plan view. Thus, the length of the seal SE2 in the second direction Y, which is in the opposite side of the terminal area MT2 of the dimming panel PNL2 is longer than the length of the other seal SE2 in the second direction Y. Furthermore, the length of the seal SE1 in the second direction Y, which is in the opposite side of the terminal area MT1 of the liquid crystal display panel PNL1 is longer than the length of the other seal SE1 in the second direction Y. That is, in this structure, the seal SE1 of the liquid crystal display panel PNL1 and the seal SE2 of the diming panel PNL2 do not at least partially overlap in a plan view.

Note that, in the display device DSP of FIG. 11, the first transparent substrate 11 of the liquid crystal display panel PNL1 and the first transparent substrate 12 of the dimming panel PNL2 are thinned by polishing in order to reduce the inter-panel gap.

As mentioned above, FIG. 11 illustrates a case where the first transparent substrate 11 of the liquid crystal display panel PNL1 and the first transparent substrate 12 of the dimming panel PNL2 are thinned by polishing; however, as in FIG. 12, the first transparent substrate 11 of the liquid crystal display panel PNL1 and the first transparent substrate 12 of the dimming panel PNL2 may be made thinner by sheeting.

Figure 13:
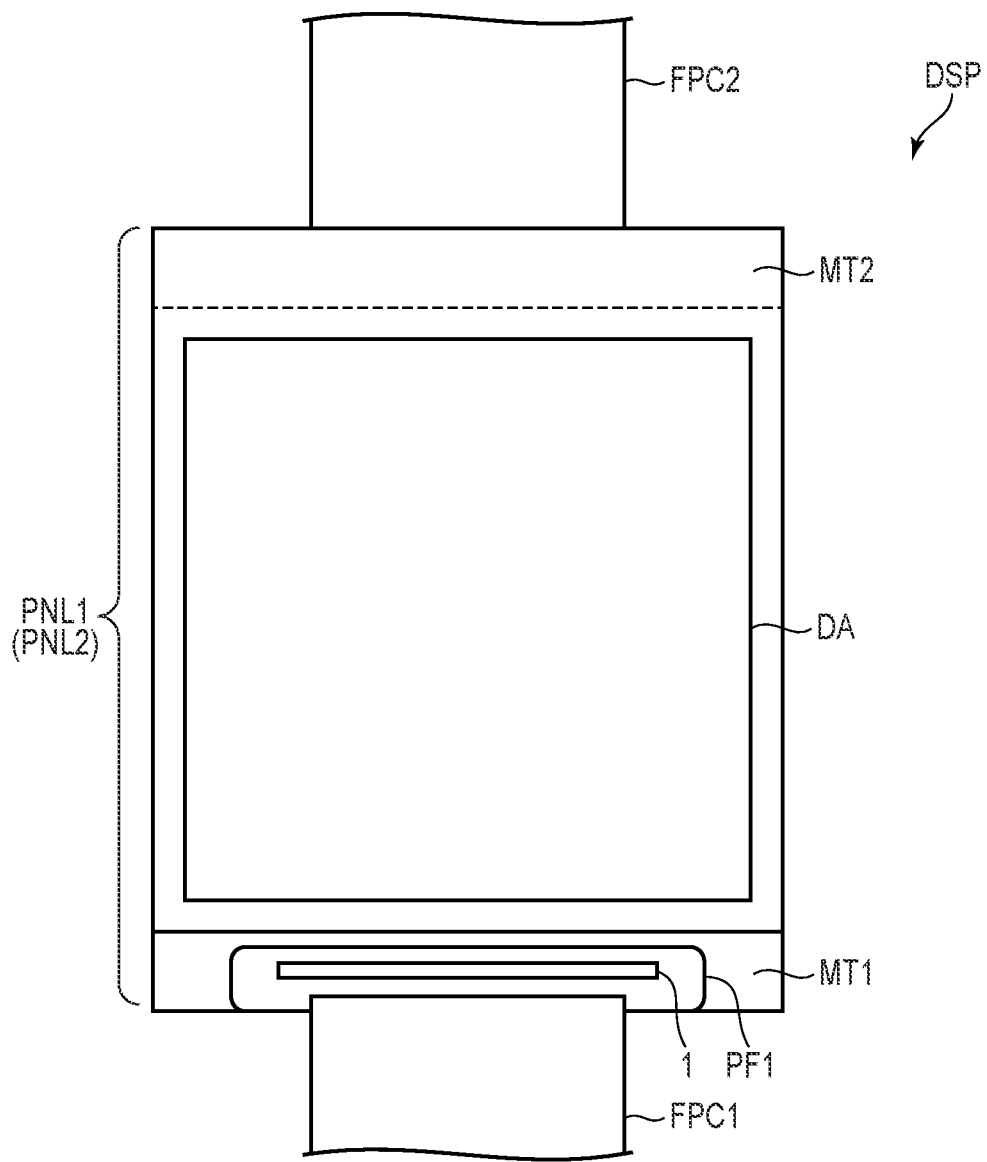
FIG. 13 is a plan view of the display device of FIGS. 11 and 12.

FIG. 13 is a plan view illustrating the display device DSP structured as in FIGS. 11 and 12.

In the structures of FIGS. 11 and 12, as in FIG. 13, the terminal area MT1 of the liquid crystal display panel PNL1 and the terminal area MT2 of the dimming panel PNL2 extend in opposite directions across the display area DA. For this reason, the flexible printed circuit board FPC1 mounted on the terminal area MT1 of the liquid crystal display panel PNL1 and the flexible printed circuit board FPC2 mounted on the terminal area MT2 of the dimming panel PNL2 extend in opposite directions across the display area DA.

That is, in this structure, the terminal area MT1 of the liquid crystal display panel PNL1 and the terminal area MT2 of the dimming panel PNL2 do not overlap in a plan view while the flexible printed circuit boards FPC1 and FPC2 mounted on the terminal areas MT1 and MT2, respectively, do not overlap in a plan view.

Furthermore, in this structure, the surfaces of the driver IC1 and the flexible printed circuit board FPC1 mounted on the terminal area MT1 of the liquid crystal display panel PNL1, and the protection film PF1 covering the above can be observed in a plan view whereas the surfaces of the driver IC2 and the flexible printed circuit board FPC2 mounted on the terminal area MT2 of the dimming panel PNL2, and the protection film covering the above cannot be observed in a plan view, and only the back surface of the flexible printed circuit board FPC2 can be observed in a plan view.

The structures of FIGS. 11 to 13 as above can achieve the same effects similar to those of the above-described structures of FIGS. 5 to 7.

FIG. 14 is a cross-sectional view illustrating another example of the schematic structure of the display device DSP of the present embodiment.

The display device DSP of FIG. 14 includes the dimming panel PNL2 adhered to the liquid crystal display panel PNL1 in a reversed manner, which is different from the structure of FIG. 5. Specifically, in the display device DSP of FIG. 5, the liquid crystal display panel PNL1 and the dimming panel PNL2 are adhered such that the main surface 11A of the first transparent substrate 11 of the liquid crystal display panel PNL1 and the main surface 22B of the second transparent substrate 22 of the dimming panel PNL2 are opposed to each other; however, in the display device DSP of FIG. 14, the liquid crystal display panel PNL1 and the dimming panel PNL2 are adhered such that the main surface 11A of the first transparent substrate 11 of the liquid crystal display panel PNL1 and the main surface 12A of the first transparent substrate 12 of the dimming panel PNL2 are opposed to each other. Furthermore, in the display device DSP of FIG. 14, the terminal area MT1 of the liquid crystal display panel PNL1 and the terminal area MT2 of the dimming panel PNL2 extend in the same direction and overlap in a plan view.

Note that, in the display device DSP of FIG. 14, the first transparent substrate 11 of the liquid crystal display panel PNL1 and the first transparent substrate 12 of the dimming panel PNL2 are thinned by polishing in order to reduce the inter-panel gap.

Figure 15:
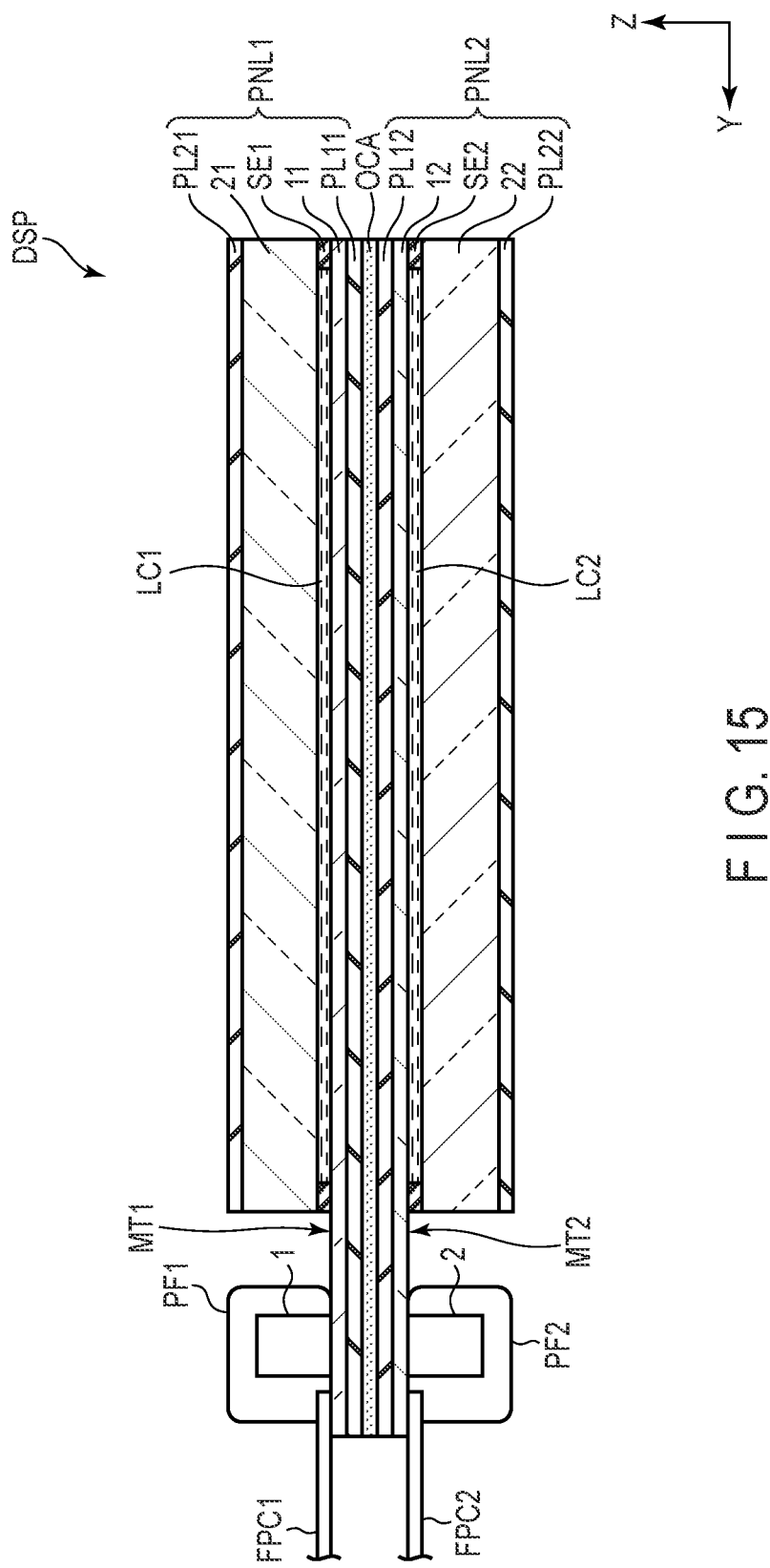
FIG. 15 is a cross-sectional view of yet another example of the structure of the embodiment.

As mentioned above, FIG. 14 illustrates a case where the first transparent substrate 11 of the liquid crystal display panel PNL1 and the first transparent substrate 12 of the dimming panel PNL2 are thinned by polishing; however, as in FIG. 15, the first transparent substrate 11 of the liquid crystal display panel PNL1 and the first transparent substrate 12 of the dimming panel PNL2 may be made thinner by sheeting.

Figure 16:
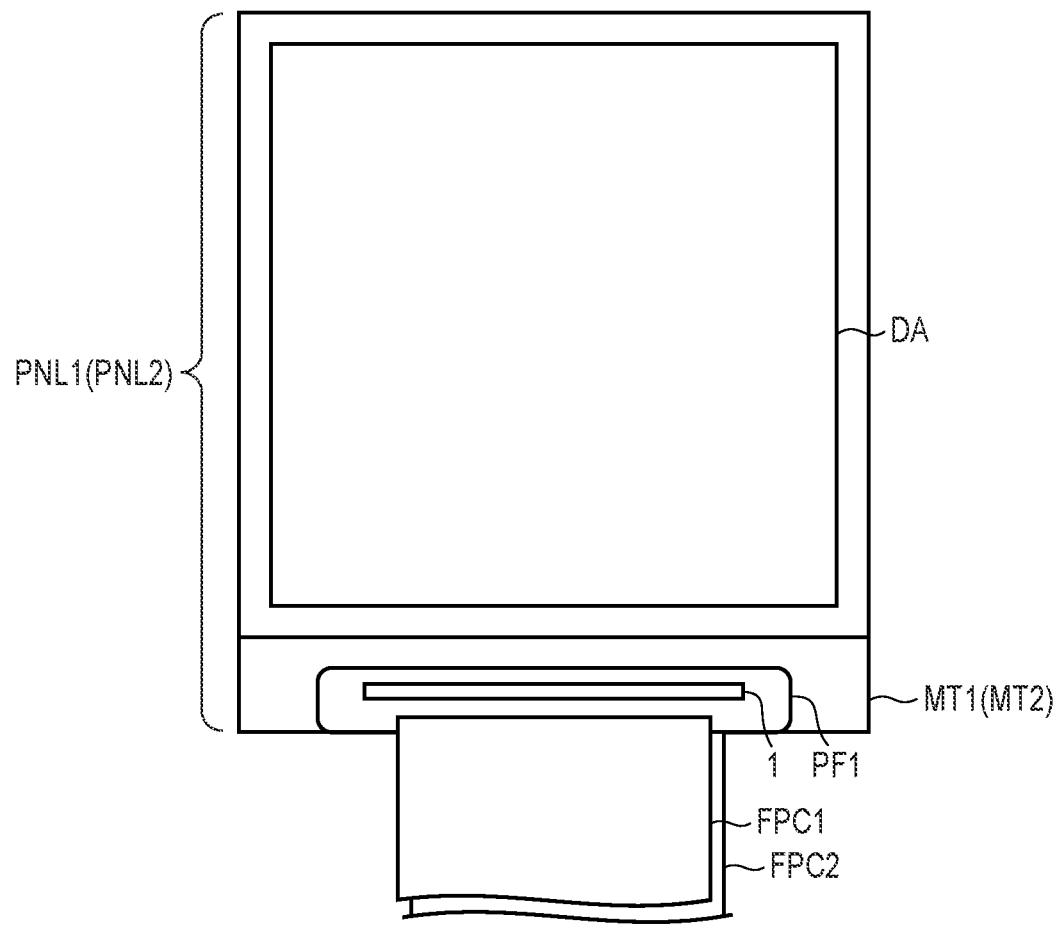
FIG. 16 is a plan view of the display device of FIGS. 14 and 15.

FIG. 16 is a plan view illustrating the display device DSP structured as in FIGS. 14 and 15.

In the structures of FIGS. 14 and 15, as in FIG. 16, the terminal area MT1 of the liquid crystal display panel PNL1 and the terminal area MT2 of the dimming panel PNL2 extend in the same direction. For this reason, the flexible printed circuit board FPC1 mounted on the terminal area MT1 of the liquid crystal display panel PNL1 and the flexible printed circuit board FPC2 mounted on the terminal area MT2 of the dimming panel PNL2 extend in the same direction opposite to the display area DA.

That is, in this structure, the terminal area MT1 of the liquid crystal display panel PNL1 and the terminal area MT2 of the dimming panel PNL2 overlap in a plan view while the flexible printed circuit boards FPC1 and FPC2 mounted on the terminal areas MT1 and MT2, respectively, overlap in a plan view.

With the structures of FIGS. 14 to 16 as above, various effects achieved in the above-described structures of FIGS. 5 to 7 except for guaranteeing the reinforced mounting part can be achieved. Specifically, in the structure of FIG. 15, there is a high possibility that the strength of the mounting part becomes insufficient, which means it is easily damaged. On the other hand, in this structure, the lengths of all seals SE1 and SE2 in the second direction Y can be matched, and all seals SE1 and SE2 overlap in a plan view, which means the display area DA can be formed larger than in the other structures.

According to the embodiment described above, a display device DSP includes: a liquid crystal display panel PNL1 including a first transparent substrate 11 with a terminal area MT1 in which a terminal part is formed, and a second transparent substrate 21 which is opposed to the first transparent substrate 11 and has a thickness different from that of the first transparent substrate 11; a dimming panel PNL2 including a first transparent substrate 12 with a terminal area MT2 in which a terminal part is formed, and a second transparent substrate 22 which is opposed to the first transparent substrate 12 and has a thickness different from that of the first transparent substrate 12; and an adhesive layer OCA adhering the liquid crystal display panel PNL1 and the dimming panel PNL2, wherein the terminal area MT1 and the terminal area MT2 do not overlap with each other in a plan view.

With the aforementioned structure, the protection film PF2 arranged on the terminal area MT2 can be prevented from contacting the liquid crystal panel PNL1 even if the inter-panel gap is reduced in order to suppress the generation of moire, and thus, the dual cell structure display device with high display quality can be achieved.

Furthermore, according to the embodiment described above, a display device DSP includes: a liquid crystal display panel PNL1 including a first transparent substrate 11 with a terminal area MT1 in which a terminal part is formed, and a second transparent substrate 21 which is opposed to the first transparent substrate 11 and has a thickness different from that of the first transparent substrate 11; a dimming panel PNL2 including a first transparent substrate 12 with a terminal area MT2 in which a terminal part is formed, and a second transparent substrate 22 which is opposed to the first transparent substrate 12 and has a thickness different from that of the first transparent substrate 12; and an adhesive layer OCA adhering the first transparent substrate 11 of the liquid crystal display panel PNL1 and the first transparent substrate 12 of the dimming panel PNL2.

With the aforementioned structure, various elements arranged on the terminal area MT1 and various elements arranged on the terminal rea MT2 have thicknesses in opposite direction even if the inter-panel gap is reduced in order to suppress the generation of moire, and thus, the protection film PF2 arranged on the terminal area MT2 can be prevented from contacting the liquid crystal display panel PNL1, and thus, the dual cell structure display device with high display quality can be achieved.

Note that, in the present embodiment, a light-shielding film BM2 is disposed on the second substrate SUB22 of the dimming panel PNL2; however, the light-shielding film BM2 on the second substrate SUB22 of the dimming panel PNL2 may be omitted. Note that, even if the light-shielding film BM2 is omitted, there is a possibility of moire because of metallic layer and the like, which are not shown, disposed above the scan lines G and the signal lines S disposed in the first substrate SUB12 of the dimming panel PNL2, and thus, various structures of the present embodiment function effectively. Note that, if the light-shielding film BM2 is omitted, there are various effects achievable such that moire to be generated because of the light-shielding film BM2 itself can be prevented, cost for the light-shielding film BM2 can be reduced, and transmittance can be improved.

A skilled person would conceive various changes and modifications of the present invention within the scope of the technical concept of the invention, and naturally, such changes and modifications are encompassed by the scope of the present invention. For example, if a skilled person adds/deletes/alters a structural element or design to/from/in the above-described embodiments, or adds/deletes/alters a step or a condition to/from/in the above-described embodiment, as long as they fall within the scope and spirit of the present invention, such addition, deletion, and altercation are encompassed by the scope of the present invention.

Furthermore, regarding the present embodiments, any advantage and effect those will be obvious from the description of the specification or arbitrarily conceived by a skilled person are naturally considered achievable by the present invention.

What is claimed is:

1. A display device comprising:
a first display panel including a first substrate, a first driver integrated circuit (IC) mounted on a first terminal area in an upper surface of the first substrate, and a second substrate which is opposed to the upper surface of the first substrate and has a thickness different from that of the first substrate;
a second display panel including a third substrate, a second driver integrated circuit (IC) mounted on a second terminal area in an upper surface of the third substrate, and a fourth substrate which is opposed to the upper surface of the third substrate and has a thickness different from that of the third substrate;
an adhesive layer adhering the first substrate of the first display panel and the fourth substrate of the second display panel;
a first protection film located on the first terminal area; and
a second protection film located on the second terminal area, wherein
the first terminal area and the second terminal area do not overlap with each other in a plan view,
the first driver IC and the second driver IC do not overlap with each other in the plan view,
the first driver IC overlaps with the first substrate and does not protrude from the first substrate in the plan view,
the second driver IC overlaps with the third substrate and does not protrude from the third substrate in the plan view,
the first terminal area and the second terminal area extend in opposite directions,
the thickness of the first substrate is thinner than that of the second substrate, and the thickness of the fourth substrate is thinner than that of the third substrate,
the thickness of the first substrate is thinner than that of the first protection film, and
the thickness of the fourth substrate is thinner than that of the second protection film.

2. The display device of claim 1, wherein the first substrate of the first display panel and the fourth substrate of the second display panel are sheet-shaped substrates.

3. A display device comprising:
a first display panel including a first substrate, a first driver integrated circuit (IC) mounted on a first terminal area in an upper surface of the first substrate, and a second substrate which is opposed to the upper surface of the first substrate and has a thickness different from that of the first substrate;
a second display panel including a third substrate, a second driver integrated circuit (IC) mounted on a second terminal area in an upper surface of the third substrate, and a fourth substrate which is opposed to the upper surface of the third substrate and has a thickness different from that of the second substrate;

an adhesive layer which adhering the first substrate of the first display panel and the fourth substrate of the second display panel;

a first protection film located on the first terminal area; and a second protection film located on the second terminal area, wherein the first terminal area and the second terminal area extend in the same direction and do not overlap with each other in a plan view, the first driver IC and the second driver IC do not overlap with each other in the plan view, the first driver IC overlaps with the first substrate and does not protrude from the first substrate in the plan view, the second driver IC overlaps with the third substrate and does not protrude from the third substrate in the plan view, the first driver IC is between the second driver IC and the second substrate in the plan view, the thickness of the first substrate is thinner than that of the second substrate, and the thickness of the fourth substrate is thinner than that of the third substrate, the thickness of the first substrate is thinner than that of the first protection film, and the thickness of the fourth substrate is thinner than that of the second protection film.

4. The display device of claim 3, wherein the first substrate of the first display panel and the fourth substrate of the second display panel are sheet-shaped substrates.

* * * * *